(12) United States Patent
Mori et al.

(10) Patent No.: US 9,565,107 B2
(45) Date of Patent: Feb. 7, 2017

(54) PACKET RELAY SYSTEM, PACKET RELAY METHOD, AND PACKET RELAY DEVICE

(71) Applicant: FUJITSU LIMITED, Kawasaki-shi, Kanagawa (JP)

(72) Inventors: Kenya Mori, Yokohama (JP); Mikio Kosone, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 287 days.

(21) Appl. No.: 14/317,430

(22) Filed: Jun. 27, 2014

(65) Prior Publication Data
US 2015/0009819 A1 Jan. 8, 2015

(30) Foreign Application Priority Data
Jul. 5, 2013 (JP) ................................. 2013-142125

(51) Int. Cl.
*H04L 12/703* (2013.01)
*H04L 12/801* (2013.01)
*H04L 12/851* (2013.01)

(52) U.S. Cl.
CPC ............ *H04L 47/12* (2013.01); *H04L 47/2408* (2013.01)

(58) Field of Classification Search
CPC .......... H04L 45/22; H04L 45/28; H04L 45/60; H04L 47/122; H04L 47/12
See application file for complete search history.

(56) References Cited

U.S. PATENT DOCUMENTS

| 7,933,198 B1* | 4/2011 | Pan | H04L 45/586 370/216 |
|---|---|---|---|
| 2003/0200333 A1* | 10/2003 | Espieu | H04L 45/00 709/240 |
| 2004/0215821 A1* | 10/2004 | Regan | H04L 45/00 709/240 |
| 2008/0219167 A1* | 9/2008 | Xu | H04L 47/10 370/237 |
| 2011/0242968 A1* | 10/2011 | Cirkovic | H04L 45/00 370/221 |
| 2014/0334292 A1* | 11/2014 | Chang | H04W 24/04 370/225 |

FOREIGN PATENT DOCUMENTS

| JP | 2006-310903 | 11/2006 |
|---|---|---|
| JP | 2007-151041 | 6/2007 |

* cited by examiner

*Primary Examiner* — Scott M Sciacca
(74) *Attorney, Agent, or Firm* — Staas & Halsey LLP

(57) ABSTRACT

A packet relay system includes a first packet relay device and a second packet relay device. One of the first packet relay device and the second packet relay device relays a packet based on a first priority level of the first packet relay device and on a second priority level of the second packet relay device, the first priority level is higher than the second priority level, when the first packet relay device recovers from an error state, the first packet relay device transmits a first notification, the first notification notifies the second packet relay device of the first priority level, based on the first notification, the second packet relay device changes the second priority level to a third priority level that is higher than the first priority level, and the second packet relay device changes the third priority level to the second priority level after receiving path information.

11 Claims, 15 Drawing Sheets

FIG. 4A

| VRRP SETTING INFORMATION | BGP SETTING INFORMATION |
|---|---|
| interface 1/1<br>ip address 10. 1. 1. 20/24<br>vrrp 1 ip 10. 1. 1. 30<br>vrrp 1 priority 100<br>!<br>interface 1/2<br>shutdown<br>!<br>interface 2/1<br>ip address 1. 1. 2. 1/24<br>!<br>interface 2/2<br>ip address 1. 1. 3. 1/24 | router bgp local-as 1<br>neighbor 10. 1. 1. 2 remote-as 2<br>network 1. 1. 2. 0/24<br>network 1. 1. 3. 0/24 |
|  | BGP PEER SETTING INFORMATION<br>VRRP 1<br>  neighbor 10. 1. 1. 2 |

FIG. 4B

| DESTINATION IP ADDRESS | NEXT HOP | OUTPUT I/F |
|---|---|---|
| 10. 1. 1. 2 | 10. 1. 2. 2 | Gi 1/2 |
| 192. 16. 1. 2 | 192. 16. 2. 2 | Gi 3/4 |
| ⋮ | ⋮ | ⋮ |

FIG. 4C

| VRRP GROUP NUMBER | BGP PEER ADDRESS |
|---|---|
| 1 | 10. 1. 1. 2 |
| 2 | 192. 16. 1. 2 |
| ⋮ | ⋮ |

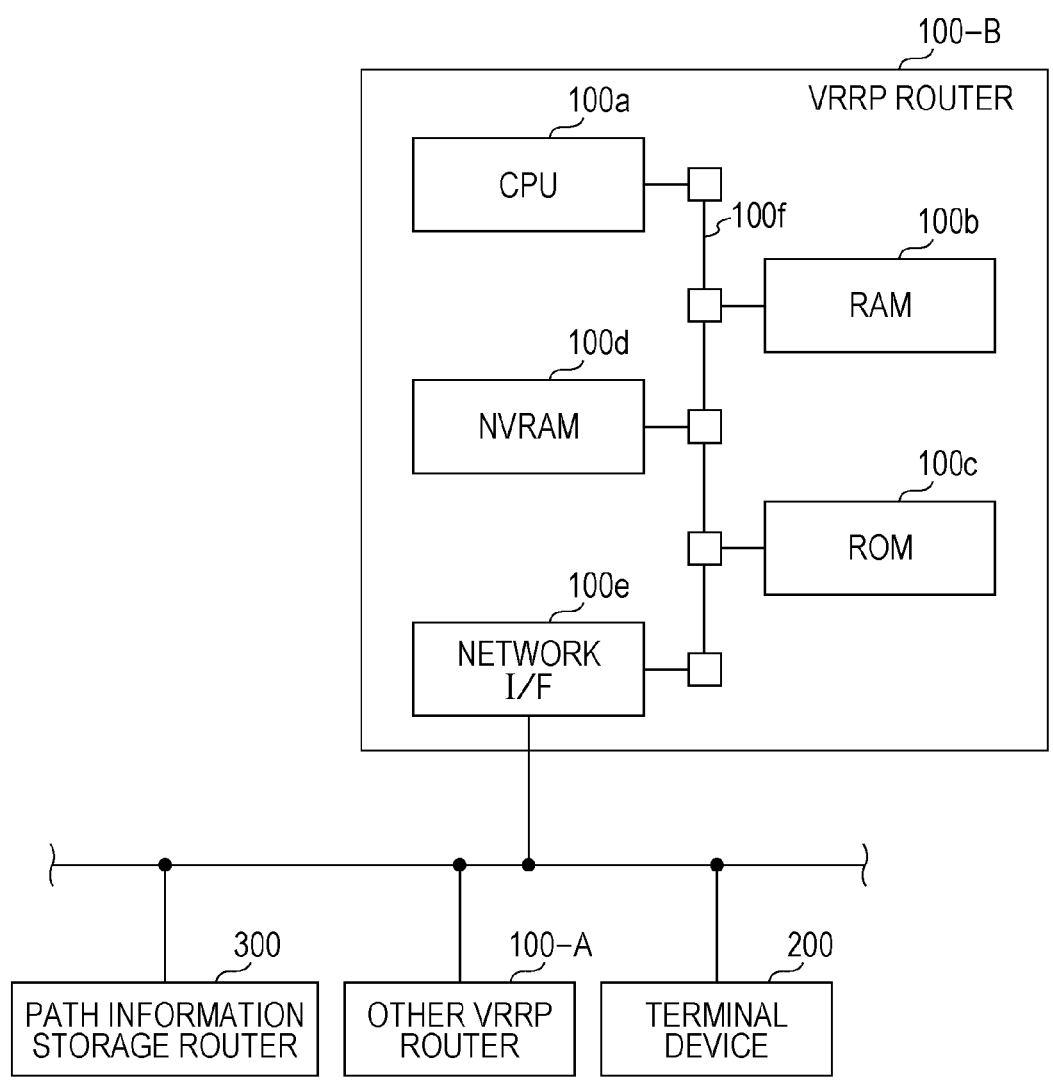

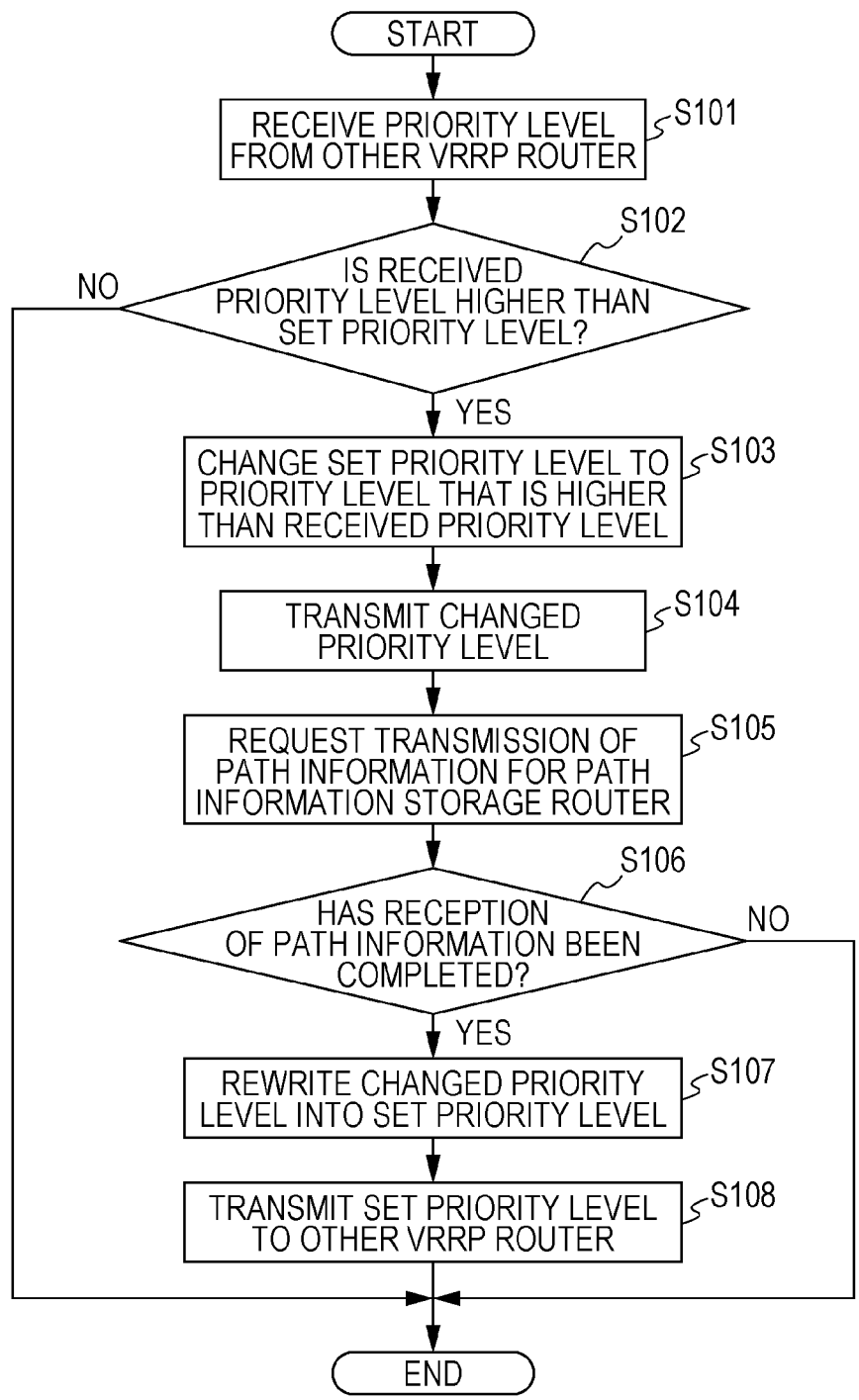

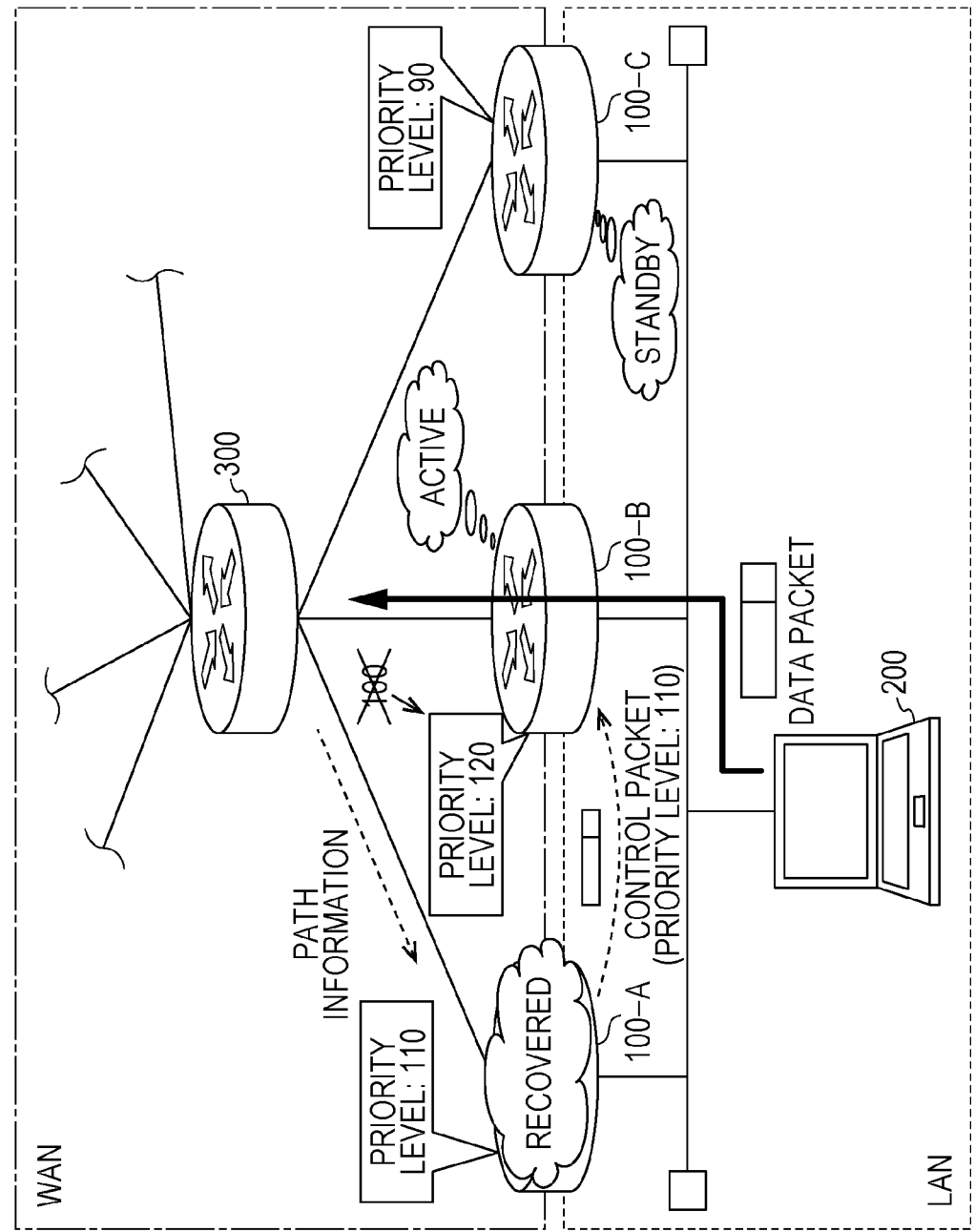

PACKET RELAY SYSTEM, PACKET RELAY METHOD, AND PACKET RELAY DEVICE

CROSS-REFERENCE TO RELATED APPLICATION

This application is based upon and claims the benefit of priority of the prior Japanese Patent Application No. 2013-142125, filed on Jul. 5, 2013, the entire contents of which are incorporated herein by reference.

FIELD

The embodiments discussed herein are related to a packet relay system, a packet relay method, and a packet relay device.

BACKGROUND

As a protocol to make a packet relay device such as a router device and a layer 3 (L3) switch redundant, a virtual router redundancy protocol (VRRP) is known. In the VRRP, priority levels are respectively set to a plurality of packet relay devices that belong to the same group. A packet relay device to which the highest priority level is set is called, for example, a master or an active system. Such a packet relay device becomes in an operation state and relays a data packet.

In addition, a packet relay device other than the master is called, for example, a slave, a standby system or a backup. The slave packet relay device is in a standby state. The state of the slave packet relay device becomes from the standby state to an operation state, and the slave packet relay device functions as a master when failure occurs in the master packet relay device. When there are a plurality of slave packet relay devices, order of transition to a master is determined depending on the set priority level. As described above, relay of a data packet, which has been performed in the master packet relay device, is performed in the packet relay device that has transitioned from the slave to the master. As the related art, for example, Japanese Laid-open Patent Publication No. 2006-310903 has been discussed.

SUMMARY

According to an aspect of the invention, a packet relay system includes a first packet relay device and a second packet relay device. One of the first packet relay device and the second packet relay device relays a packet based on a first priority level that is set to the first packet relay device and on a second priority level that is set to the second packet relay device, the first priority level is higher than the second priority level, when the first packet relay device recovers from an error state, the first packet relay device transmits a first notification to the second packet relay device, the first notification notifies the second packet relay device of the first priority level, based on the first notification, the second packet relay device changes the second priority level to a third priority level that is higher than the first priority level, and requests a path information storage to transmit a path information, and the second packet relay device changes the third priority level to the second priority level after receiving the path information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4A is a diagram illustrating an example of setting information;

FIG. 4B is a diagram illustrating an example of a routing table;

FIG. 4C is a diagram illustrating an example of a BGP peer address table;

FIG. 5 is a diagram illustrating an example of a hardware structure of the VRRP router;

FIG. 6 is a flowchart illustrating an example of an operation of the VRRP router;

FIG. 15 is a diagram illustrating an example of operations of the VRRP routers in the second embodiment.

DESCRIPTION OF EMBODIMENTS

When the master packet relay device in which failure has occurred is recovered from the failure, the state becomes the operation state again. After that, the master packet relay device receives path information from a packet relay device outside the group, which stores the path information, and learns the path information. As a result, the packet relay device that has returned to the master grasps a relay destination of a data packet. However, when there is a large amount of path information, it takes a long time to learn the path information. For example, in a case in which a data packet is input to the master packet relay device during learning of the path information, a problem occurs that the input data packet is discarded when a relay destination of the data packet is not grasped.

An object of an embodiment discussed below is to provide a packet relay device that avoids that a master packet relay device belonging to the same group as the other packet relay devices becomes in an operation state before the master packet relay device completes to receive path information, a packet relay system, and a packet relay method.

(First Embodiment)

Figure 1:
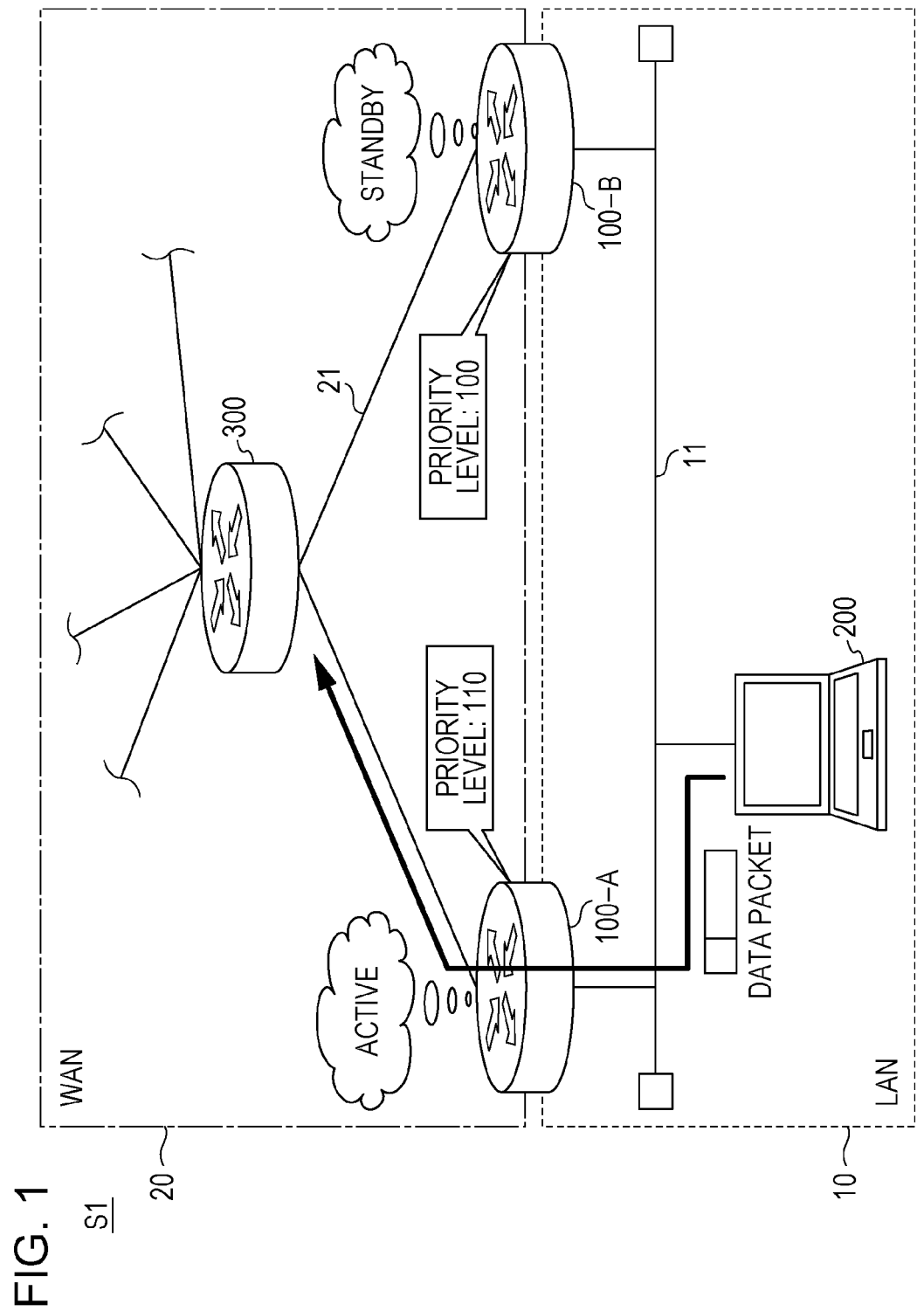
FIG. 1 is a diagram illustrating a schematic structure of a packet relay system.
Figure 2:
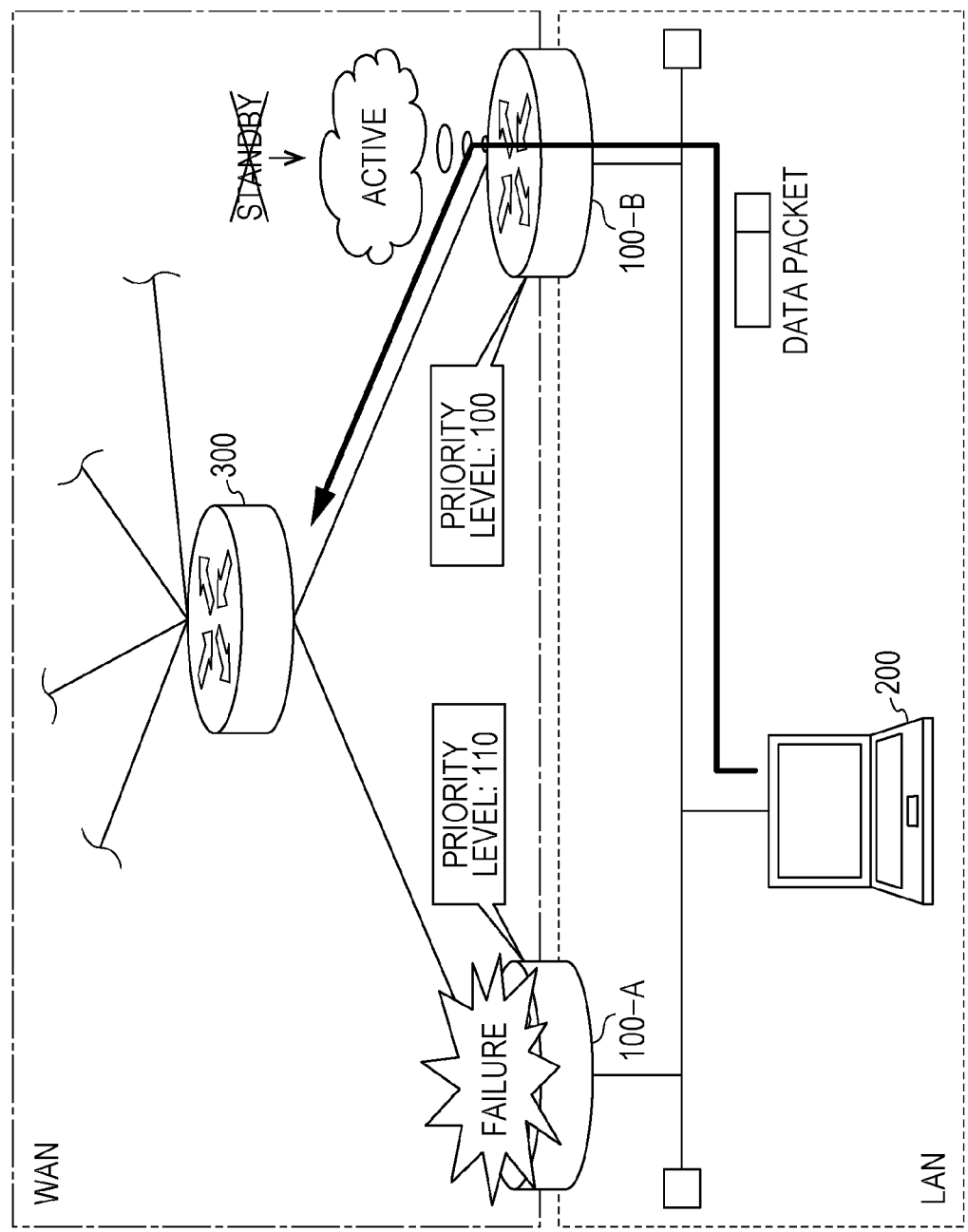
FIG. 2 is a diagram illustrating a schematic structure of the packet relay system.

FIGS. 1 and 2 are diagrams illustrating schematic structures of a packet relay system S1. More specifically, FIG. 1 illustrates a structure before failure occurs, and FIG. 2 illustrates a structure when failure occurs.

The packet relay system S1 includes VRRP routers 100-A and 100-B as illustrated in FIGS. 1 and 2.

The VRRP routers 100-A and 100-B are router devices that respectively have VRRP functions. Each of the VRRP routers 100-A and 100-B includes a routing protocol such as a routing information protocol (RIP), open shortest path first (OSPF), and a border gateway protocol (BGP) in addition to the VRRP function. The VRRP routers 100-A and 100-B are arranged so as to be oppose to each other on a boundary between a local area network (LAN) 10 and a wide area network (WAN) 20. That is, the VRRP routers 100-A and 100-B are gateways that connect the LAN 10 and the WAN 20. The internet may be used instead of the WAN 20.

In the LAN 10, a terminal device 200 is included. As the terminal device 200, for example, a personal computer (PC) and a mobile information terminal may be employed. The terminal device 200 and each of the VRRP routers 100-A and 100-B are coupled to each other, for example, through a LAN cable 11. Instead of a wire such as the LAN cable 11, the terminal device 200 and each of the VRRP routers 100-A and 100-B may be coupled to each other through radio communication.

In the WAN 20, a path information storage router 300 is included. The path information storage router 300 is a router device that stores path information that the VRRP routers 100-A and 100-B are caused to learn. The path information storage router 300 and each of the VRRP routers 100-A and 100-B are coupled to each other, for example, through cables 21 such as an optical fiber cable and a metal cable. In addition, the path information storage router 300 is coupled to various router devices (not illustrated). In FIGS. 1 and 2, the path information storage router 300 and each of the VRRP routers 100-A and 100-B are directly coupled to each other, but at least one router device may lie between the path information storage router 300 and the VRRP router 100-A, and between the path information storage router 300 and the VRRP router 100-B. That is, the path information storage router 300 and each of the VRRP routers 100-A and 100-B may be indirectly coupled to each other.

In FIGS. 1 and 2, a priority level "110" is set to the VRRP router 100-A, and a priority level "100" is set to the VRRP router 100-B. Therefore, the state of the VRRP router 100-A is "active", that is, the VRRP router 100-A is in an operation state. The state of the VRRP router 100-B is "standby", that is, the VRRP router 100-B is in a standby state. Here, as illustrated in FIG. 1, when a data packet is transmitted from the terminal device 200, the data packet is input to the VRRP router 100-A to which the priority level "110" is set that is higher than the set priority level "100" that is set to the VRRP router 100-B. The input data packet is relayed to the path information storage router 300 based on a routing table, which is described later, and stored in the VRRP router 100-A.

However, as illustrated in FIG. 2, when failure occurs in the VRRP router 100-A, the state of the VRRP router 100-B is switched from "standby" to "active" based on the VRRP function. More specifically, between the VRRP router 100-A and the VRRP router 100-B, communication of an advertisement packet is periodically performed for each unit of seconds. The advertisement packet is a packet that is used to indicate the occurrence of failure. For example, when failure occurs in the VRRP router 100-A the state of which is "active", an advertisement packet is not transmitted from the VRRP router 100-A. When an advertisement packet is not received in the VRRP router 100-B, the VRRP router 100-B determines that failure occurs in the VRRP router 100-A, and the state of the VRRP router 100-B is switched from "standby" to "active".

As a result, as illustrated in FIG. 2, a data packet transmitted from the terminal device 200 is input to the VRRP router 100-B the state of which has become "active". The input data packet is relayed to the path information storage router 300 based on a routing table that is stored in the VRRP router 100-B.

The VRRP router 100-B is described below in detail with reference to FIGS. 3, 4A, 4B, and 4C.

The VRRP router 100-A has substantially the same structure as the VRRP router 100-B. Therefore, the VRRP router 100-B is described as an example of a VRRP router 100.

Figure 3:
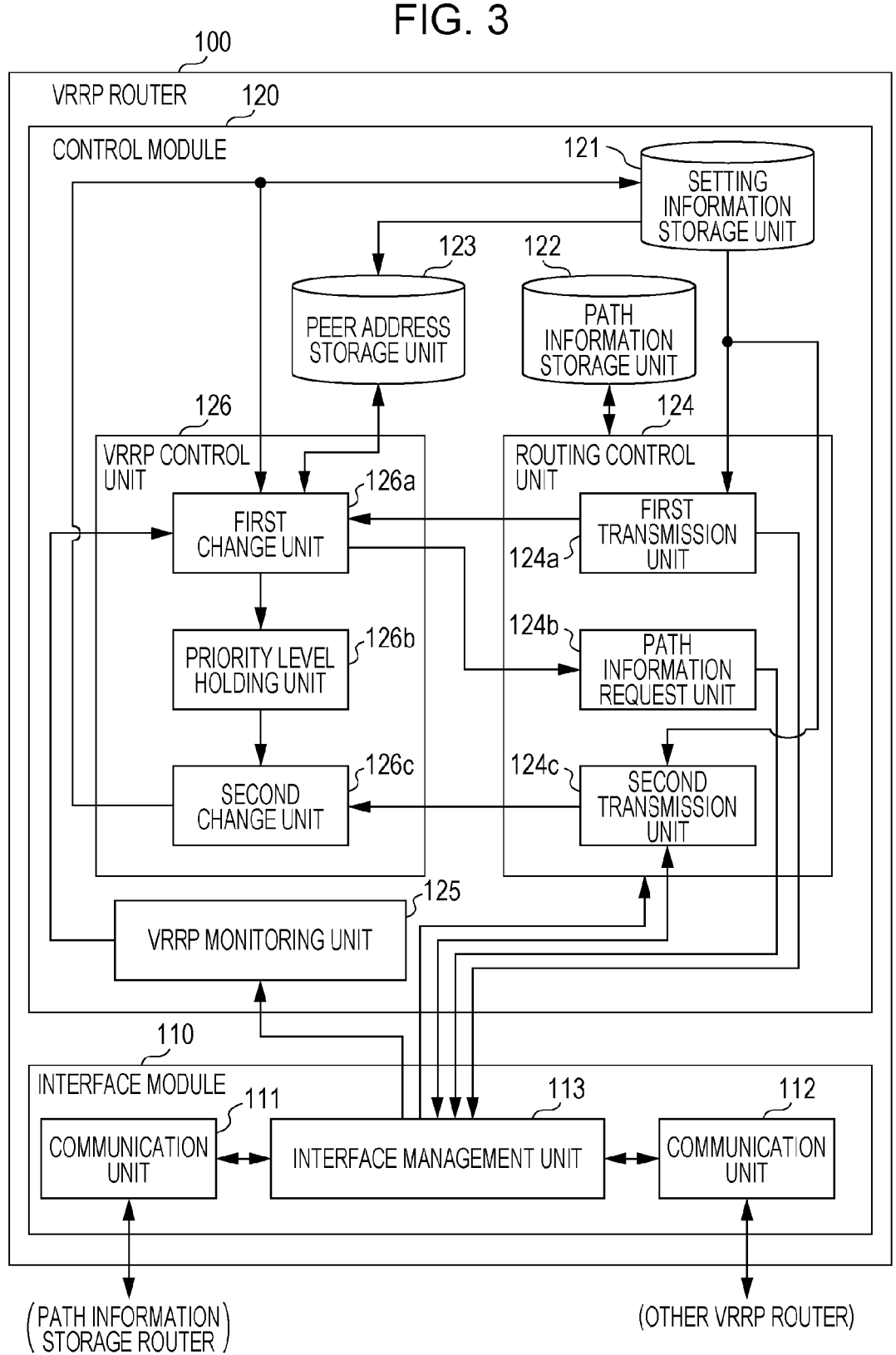
FIG. 3 is a functional block diagram illustrating a VRRP router.

FIG. 3 is a functional block diagram illustrating the VRRP router 100. FIG. 4A is a diagram illustrating an example of setting information. FIG. 4B is a diagram illustrating an example of a routing table. FIG. 4C is a diagram illustrating an example of a BGP peer address table.

As illustrated in FIG. 3, the VRRP router 100 includes an interface module 110 and a control module 120.

The interface module 110 includes communication units 111 and 112, and an interface management unit 113.

The communication unit 111 communicates with the path information storage router. For example, the communication unit 111 transmits a data packet to the path information storage router 300, and receives path information that has been transmitted from the path information storage router 300 and transmits the path information to the interface management unit 113. In addition, the communication unit 111 performs communication of various pieces of information.

The communication unit 112 communicates with the other VRRP router. That is, when the VRRP router 100 illustrated in FIG. 3 is the VRRP router 100-B, the communication unit 112 communicates with the VRRP router 100-A that is the other VRRP router. The communication unit 112 receives a data packet that has been transmitted from the terminal device 200 and transmits the data packet to the interface management unit 113. The communication unit 112 performs transmission and reception of the above-described advertisement packet. In addition, the communication unit 112 performs communication of various pieces of information.

The interface management unit 113 manages the states of the communication units 111 and 112. For example, when the state of at least one of the communication units 111 and 112 is changed, the interface management unit 113 outputs state change notification that indicates change in the state, to the control module 120.

The control module 120 includes a setting information storage unit 121, a path information storage unit 122, a peer address storage unit 123, a routing control unit 124, a VRRP monitoring unit 125, and a VRRP control unit 126.

The setting information storage unit 121 stores setting information. The setting information is called, for example, "configuration". The setting information is registered to the setting information storage unit 121 by setting that has been made for the VRRP router 100. As illustrated in FIG. 4A, a setting information table includes VRRP setting information, BGP setting information, and BGP peer setting information.

In the VRRP setting information, "vrrp 1" indicates that a VRRP group number is "1". The VRRP group number is a number that is used to identify a group of the VRRP router 100. The VRRP routers 100 having the same VRRP group number belong to the same group. The VRRP group number is called, for example, a virtual router identifier (VRID). In the embodiment, a VRRP group number "1" is set to the VRRP routers 100-A and 100-B. Therefore, the VRRP routers 100-A and 100-B belong to the same group.

In the VRRP setting information, "priority 100" indicates that a priority level is "100". The priority level indicates priority order of transition to a master as described above. In the embodiment, a priority level "100" is set to the VRRP router 100-B, and a priority level "110" is set to the VRRP router 100-A.

In the BGP setting information, "neighbor 10.1.1.2" indicates an IP address of a router device from which the VRRP router 100 obtains path information. In the embodiment, the IP address corresponds to an IP address of the path information storage router 300.

In the BGP peer setting information, "vrrp 1 neighbor 10.1.1.2" indicates that peer is established between the VRRP router 100 the VRRP group number of which is "1" and a router device the IP address of which is "10.1.1.2". That is, in the embodiment, peer is established between each of the VRRP routers 100-A and 100-B, and the path information storage router 300. An IP address for a VRRP group number is set beforehand, so that a VRRP group and an IP address between which peer is established may be easily determined.

The path information storage unit 122 stores a routing table. The routing table includes a destination IP address, a next hop, and an output interface (I/F). The destination IP address is an IP address that is used to be compared with a destination IP address that is included in a data packet. The next hop is an IP address of a router device to which the data packet is to proceed next. The output I/F is an interface of an output destination. Thus, when a destination IP address "10.1.1.2" is included in a data packet, the data packet is output to a router device to which an IP address "10.1.2.2" is assigned, from an interface "½" of the Gigabit Ethernet (registered trademark).

The peer address storage unit 123 stores a BGP peer address table. As illustrated in FIG. 4C, the BGP peer address table includes a VRRP group number and a BGP peer address. The BGP peer address table is stored in the peer address storage unit 123 by causing a part of the setting information table to be extracted when power is applied to the VRRP router 100. For example, the BGP peer setting information is extracted and stored in the peer address storage unit 123 beforehand. An IP address of the BGP peer setting information corresponds to a BGP peer address. As described above, by providing the peer address storage unit 123 in the control module 120, BGP peer setting information is referred to, and a route refresh request, which is described later, is output when the opposite VRRP router 100 (in the embodiment, the VRRP router 100-A) is recovery from failure, so that, for example, a time that is taken for the output is reduced as compared with a case in which all pieces of setting information over several thousands of lines are referred to and a router refresh request is output. To the VRRP router 100-B, a VRRP group number "2" is also set. Therefore, the VRRP router 100-B constitutes the same group with a VRRP router (not illustrated) as well in which an obtaining destination of path information corresponds to an IP address "192.16.1.2". When a BGP peer address is referred to, the VRRP router 100 may receive path information from the path information storage router 300.

The routing control unit 124 processes a routing protocol and manages the path information storage unit 122. For example, the routing control unit 124 updates the path information storage unit 122 based on path information that has been received from the path information storage router 300 through the interface management unit 113. The routing control unit 124 updates the path information storage unit 122 based on state change notification that has been output from the interface management unit 113. The routing control unit 124 includes a packet relay unit (not illustrated), and relays a data packet that has been received through the interface management unit 113, to a relay destination, by referring to the path information storage unit 122. A part of the relay of the data packet may be executed by the interface management unit 113.

In addition, as illustrated in FIG. 3, the routing control unit 124 includes a first transmission unit 124a, a path information request unit 124b, and a second transmission unit 124c.

In a case in which the state of the VRRP router 100 is "active", when a priority level that is higher than the priority level that has been set to the VRRP router 100 is received from the other VRRP router 100 that belongs to the same group, the first transmission unit 124a transmits a priority level that is higher than the received priority level, to the other VRRP router 100. For example, when a priority level "110" that is higher than the set priority level "100" is received from the VRRP router 100-A, a priority level "120" that is higher than received priority level "110" is transmitted to the VRRP router 100-A. The priority level is transmitted so as to be included in a control packet.

After the first transmission unit 124a transmits the priority level to the VRRP router 100-A, the path information request unit 124b requests transmission of path information for the path information storage router 300. For example, the path information request unit 124b requests transmission of path information when a transmission request of path information is notified from a first change unit 126a, which is described later.

When reception completion of the path information that has been transmitted in response to the request from the path information request unit 124b is detected, the second transmission unit 124c transmits the set priority level to the other VRRP router 100. For example, End of Routing Information Base marker (EoR) that is information indicating reception completion of the path information from the path information storage router 300 is detected, the second transmission unit 124c transmits the set priority level "100" to the VRRP router 100-A.

The VRRP monitoring unit 125 monitors a control packet that is related to control of the VRRP function and that is transmitted from the other VRRP router 100. When the VRRP monitoring unit 125 receives the control packet, the VRRP monitoring unit 125 obtains a priority level that is included in the control packet, and transmits the obtained priority level to the VRRP control unit 126, and notifies the VRRP control unit 126 of reception of the control packet.

The VRRP control unit 126 causes the routing control unit 124 to request path update for the path information storage router 300 depending on the operation state of the other VRRP router 100. The VRRP control unit 126 controls the operation of the other VRRP router 100 depending on a learning state of the path information.

In addition, as illustrated in FIG. 3, the VRRP control unit 126 includes the first change unit 126a, a priority level holding unit 126b, and a second change unit 126c.

The first change unit 126a changes the set priority level to a priority level that is higher than the received priority level. That is, the first change unit 126a changes setting that has been made for the VRRP router 100. For example, in a case in which the priority level "100" is set to the VRRP router 100, when the priority level "110" is received, the first change unit 126a changes the set priority level "100" to the priority level "120" that is higher than the received priority level "110".

The priority level holding unit 126b holds the priority level that has been set before the setting is changed by the first change unit 126a. For example, when the set priority level "100" is changed to the priority level "120", the priority level holding unit 126b holds the priority level "100" before the change.

The second change unit 126c returns the changed priority level to the set priority level. That is, the second change unit 126c returns the changed setting to the original setting. For example, when the set priority level "100" is changed to the priority level "120", the second change unit 126c returns the changed priority level "120" to the originally-set priority level "100" based on the priority level "100" that has been held in the priority level holding unit 126b.

A hardware structure of the VRRP router 100-B is described below with reference to FIG. 5.

The VRRP router 100-A and the path information storage router 300 have substantially the same structure as the VRRP router 100-B.

FIG. 5 is a diagram illustrating an example of the hardware structure of the VRRP router 100-B.

The VRRP router 100 includes a central processing unit (CPU) 100a, a random access memory (RAM) 100b, a read only memory (ROM) 100c, a non-volatile RAM (NVRAM) 100d, and a network interface (I/F) 100e. These elements 100a to 100e are coupled to each other through a bus 100f. A computer functions when at least the CPU 100a and the RAM 100b cooperate.

The path information storage unit 122 and the peer address storage unit 123 are obtained by the RAM 100b. The setting information storage unit 121 is obtained by the NVRAM 100d. The communication units 111 and 112 and the interface management unit 113 are obtained by the network I/F 100e. The network I/F 100e includes at least a WAN port that is used for a WAN, at least one LAN port that is used for a LAN, a physical layer chip (PHY chip), and an application specific integrated circuit (ASIC). Instead of the ASIC, a hardware circuit such as a field programmable gate array (FPGA) may be employed. To the network I/F 100e, the other VRRP router 100-A, the terminal device 200, and the path information storage router 300 are coupled.

The above-described RAM 100b reads a program that is stored in the ROM 100c. The routing control unit 124, the units 124a to 124c that are included in the routing control unit 124, the VRRP monitoring unit 125, the VRRP control unit 126, and the units 126a to 126c that are included in the VRRP control unit 126 are obtained when the CPU 100a executes the read program. In addition, a packet relay method is executed by the VRRP router 100-B, which is described later, when the CPU 100a executes the read program. The program may correspond to a flowchart, which is described later. The priority level holding unit 126b may be obtained, for example, by a cache memory of the CPU 100a (primary cache, secondary cache, and the like).

An operation of the VRRP router 100 is described below with reference to FIGS. 6 to 11.

FIG. 6 is a flowchart illustrating in an example of the operation of the VRRP router 100-B. FIGS. 7 to 11 are diagrams illustrating operations of the VRRP routers 100-A and 100-B in the first embodiment.

Figure 7:
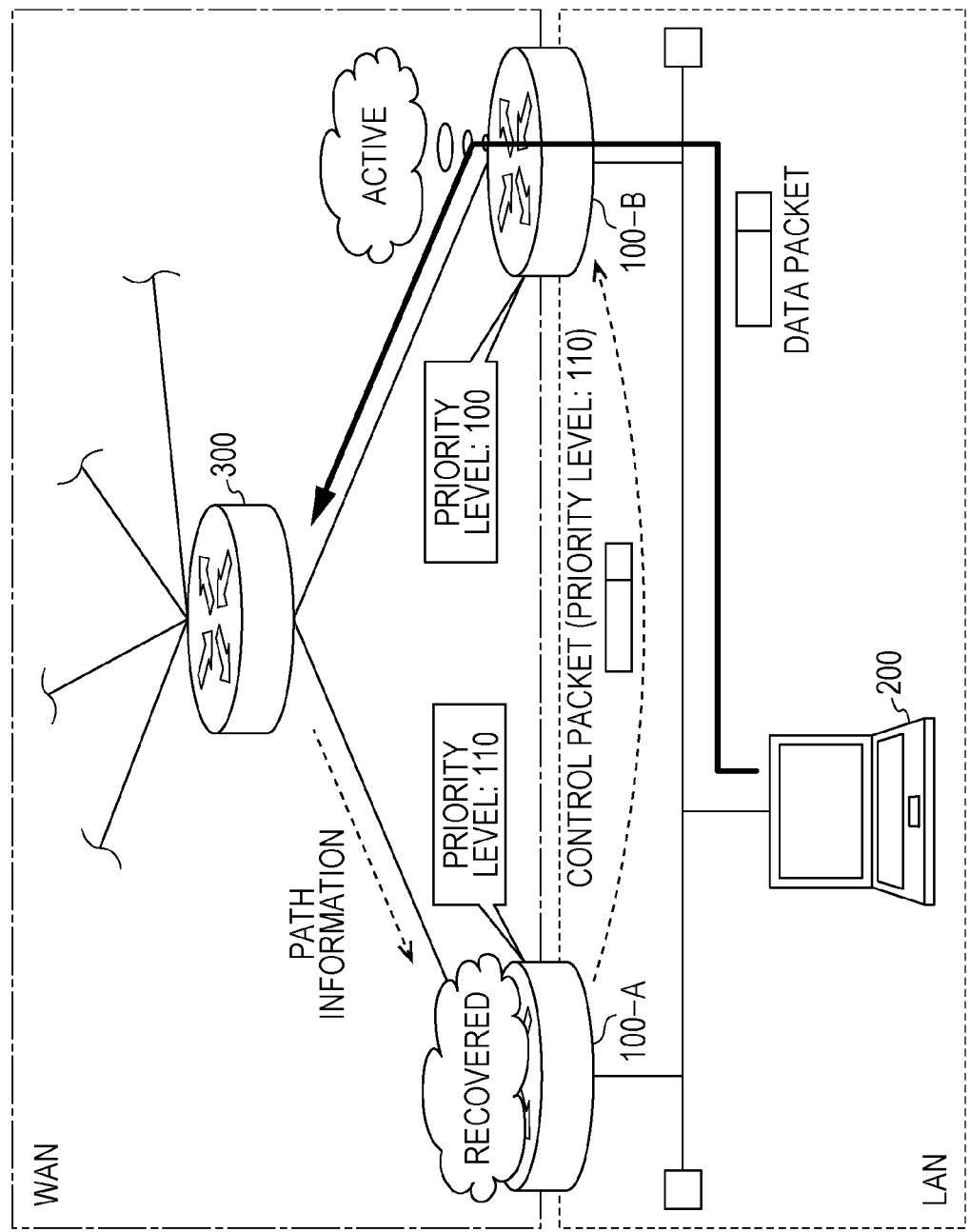
FIG. 7 is a diagram illustrating an example of operations of VRRP routers in a first embodiment.

As illustrated in FIG. 6, the communication unit 112 receives a priority level that has been transmitted from the other VRRP router 100 (Step S101). For example, as illustrated in FIG. 7, when the VRRP router 100-A recovers from failure, a control packet that includes the priority level "110" that is set to the VRRP router 100-A is transmitted to the VRRP router 100-B. With the recovery, the VRRP router 100-A starts to obtain path information from the path information storage router 300, and receives the path information. When the state of the communication unit 112 is changed, the interface management unit 113 outputs state change notification that indicates a change in the state, to the routing control unit 124. The VRRP monitoring unit 125 monitors an output of the state change notification, and when the output is an output based on a control packet that is related to a VRRP function, the VRRP monitoring unit 125 transmits the priority level "110" that is included in the control packet, to the first change unit 126a.

After that, as illustrated in FIG. 6, the first change unit 126a determines whether or not the received priority level is higher than a set priority level (Step S102). In the embodiment, the first change unit 126a refers to the setting information storage unit 121, and obtains the priority level "100" that has been stored in the setting information storage unit 121. The first change unit 126a receives the priority level "110", so that the first change unit 126a determines that received priority level "110" is higher than the set priority level "100".

When the first change unit 126a determines that the received priority level is higher than the set priority level (Yes in Step S102), the first change unit 126a changes the set priority level to a priority level that is higher than the received priority level (Step S103). In the embodiment, the set priority level "100" is changed to the priority level "120" that is higher than the received priority level "110". A certain numerical value may be set as the increase rate of the change (for example, "20") beforehand so that the changed priority level exceeds the received priority level. When the numerical value is added to the set priority level, the obtained priority level exceeds the received priority level. For example, a numerical value may be added to the set priority level, which is obtained by calculating a difference between the received priority level and the set priority level and performing integral multiple (for example, 2 times, 5 times, 10 times, and the like) on the calculated difference until the value on which integral multiple is performed exceeds the received priority level. The first change unit 126a stores the priority level "100" before the change, in the priority level holding unit 126b, and rewrites the priority level "100" that has been stored in the setting information storage unit 121 into the priority level "120". The priority level holding unit 126b holds the priority level "100".

Figure 8:
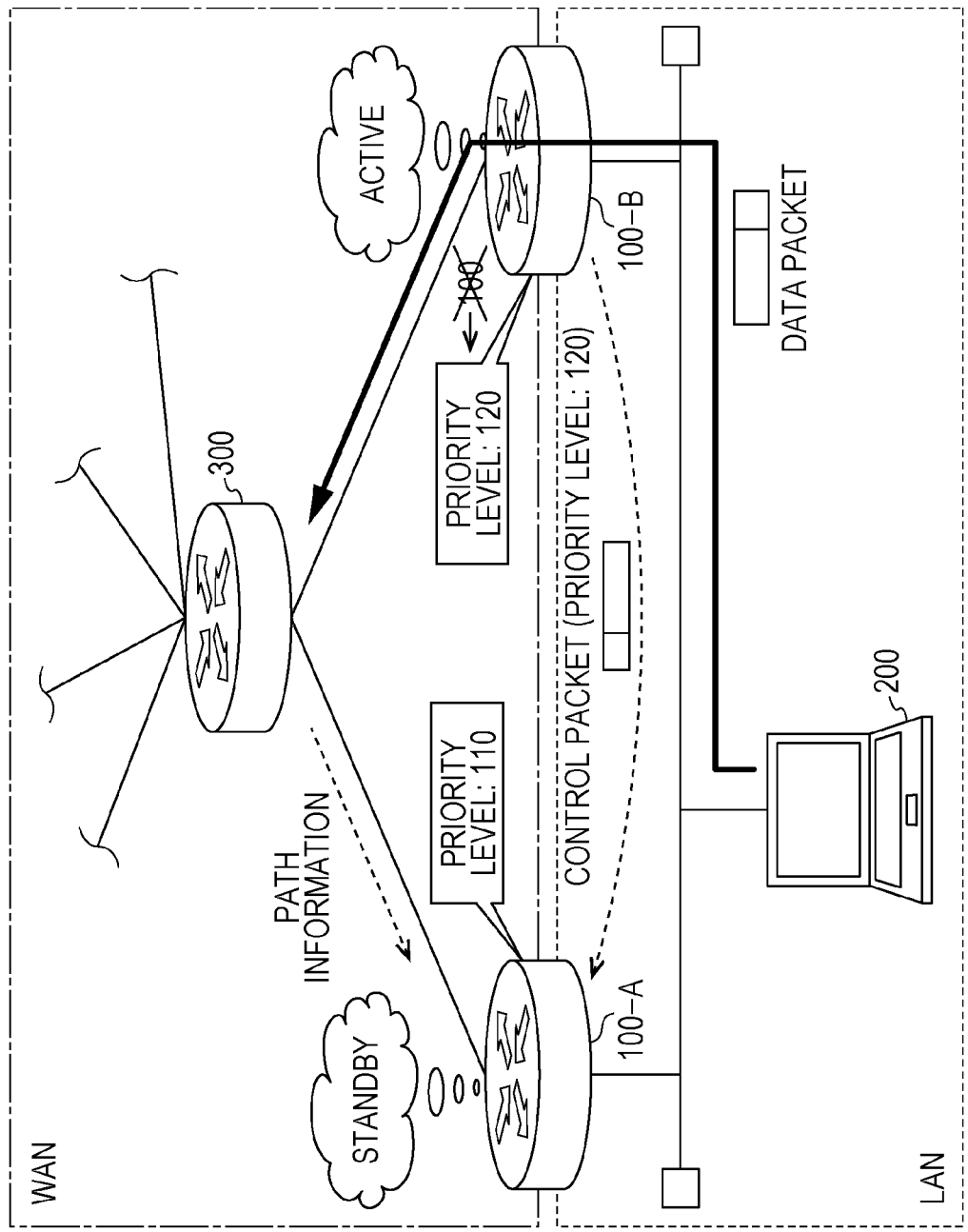
FIG. 8 is a diagram illustrating an example of operations of the VRRP routers in the first embodiment.

After that, the first transmission unit 124a transmits the changed priority level to the VRRP router 100-A (Step S104). For example, the first transmission unit 124a refers to the setting information storage unit 121, incorporates the priority level "120" that has been stored in the setting information storage unit 121, into a control packet, transmits the control packet to the VRRP router 100-A. As illustrated in FIG. 8, the control packet that includes the priority level "120" is transmitted to the VRRP router 100-A through the interface management unit 113 and the communication unit 112. Here, as illustrated in FIG. 8, the priority level "100" of the VRRP router 100-B is rewritten into the priority level "120". The priority level of the VRRP router 100-B is higher than the priority level of the VRRP router 100-A, so that the VRRP router 100-B becomes a master, and the VRRP router 100-A becomes a slave. Therefore, when a data packet is transmitted from the terminal device 200, the data packet is input to the VRRP router 100-B and relayed to the path information storage router 300.

Figure 9:
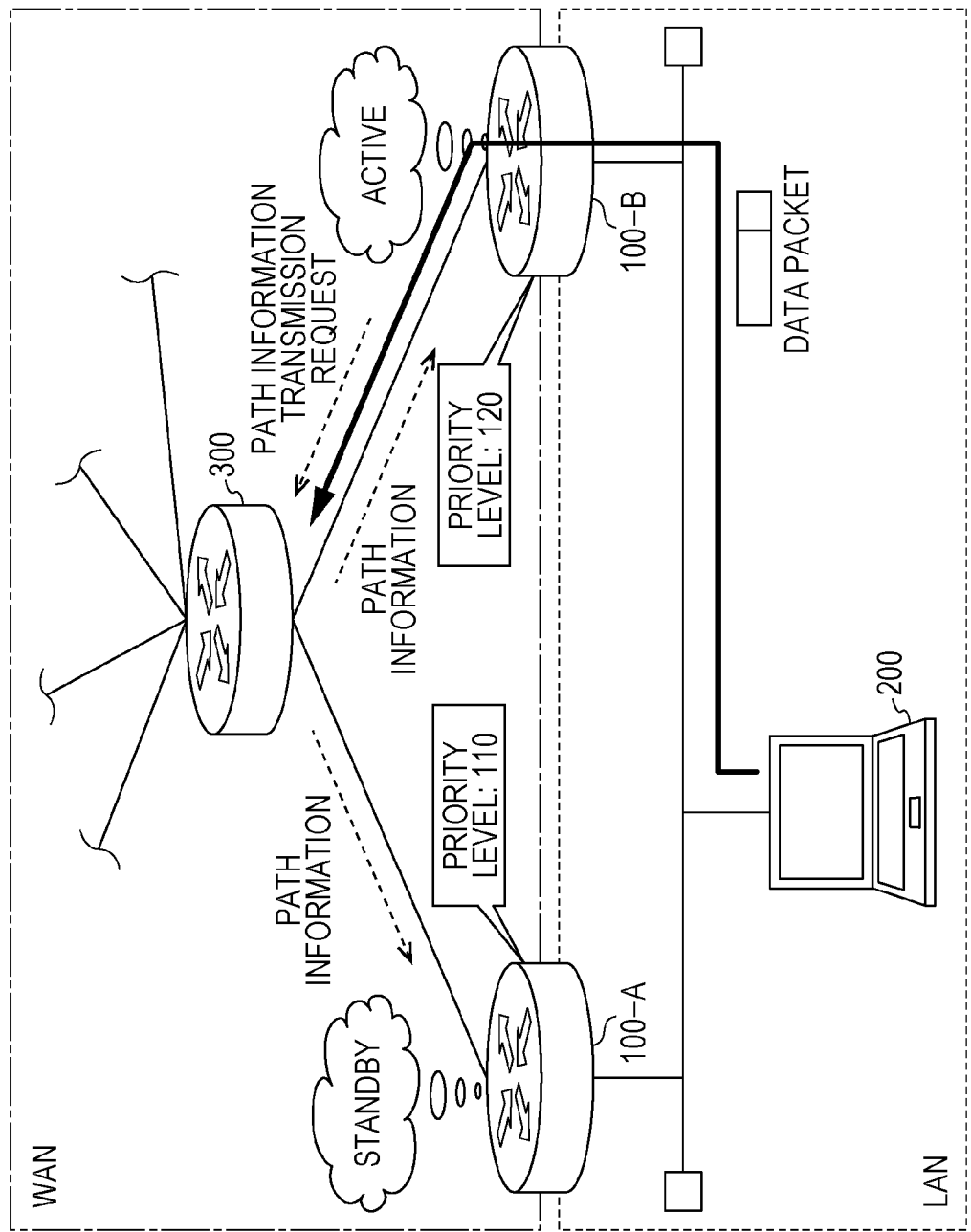
FIG. 9 is a diagram illustrating an example of operations of the VRRP routers in the first embodiment.

After that, as illustrated in FIG. 6, the path information request unit 124b requests transmission of path information for the path information storage router 300 (Step S105). For example, when the first transmission unit 124a completes transmission of the control packet, the first transmission unit 124a notifies the first change unit 126a of the completion. When the first change unit 126a receives the notification from the first transmission unit 124a, the first change unit 126a extracts a BGP peer address from the peer address storage unit 123. The first change unit 126a transmits route refresh request notification that indicates a request of path information, to the path information request unit 124b. The route refresh request notification includes the extracted BGP peer address. When the path information request unit 124b receives the route refresh request notification, the path information request unit 124b outputs a transmission request (route refresh request) of path information to the path information storage router 300, based on the BGP peer address. As illustrated in FIG. 9, the transmission request of the path information is transmitted to the path information storage router 300 through the interface management unit 113 and the communication unit 111. The path information storage router 300 transmits the path information to the VRRP router 100-B based on the transmission request. The VRRP router 100-B relays a data packet based on the path information before the transmission request, in the learning of a path, so that the data packet is not affected by the learning of the path.

Figure 10:
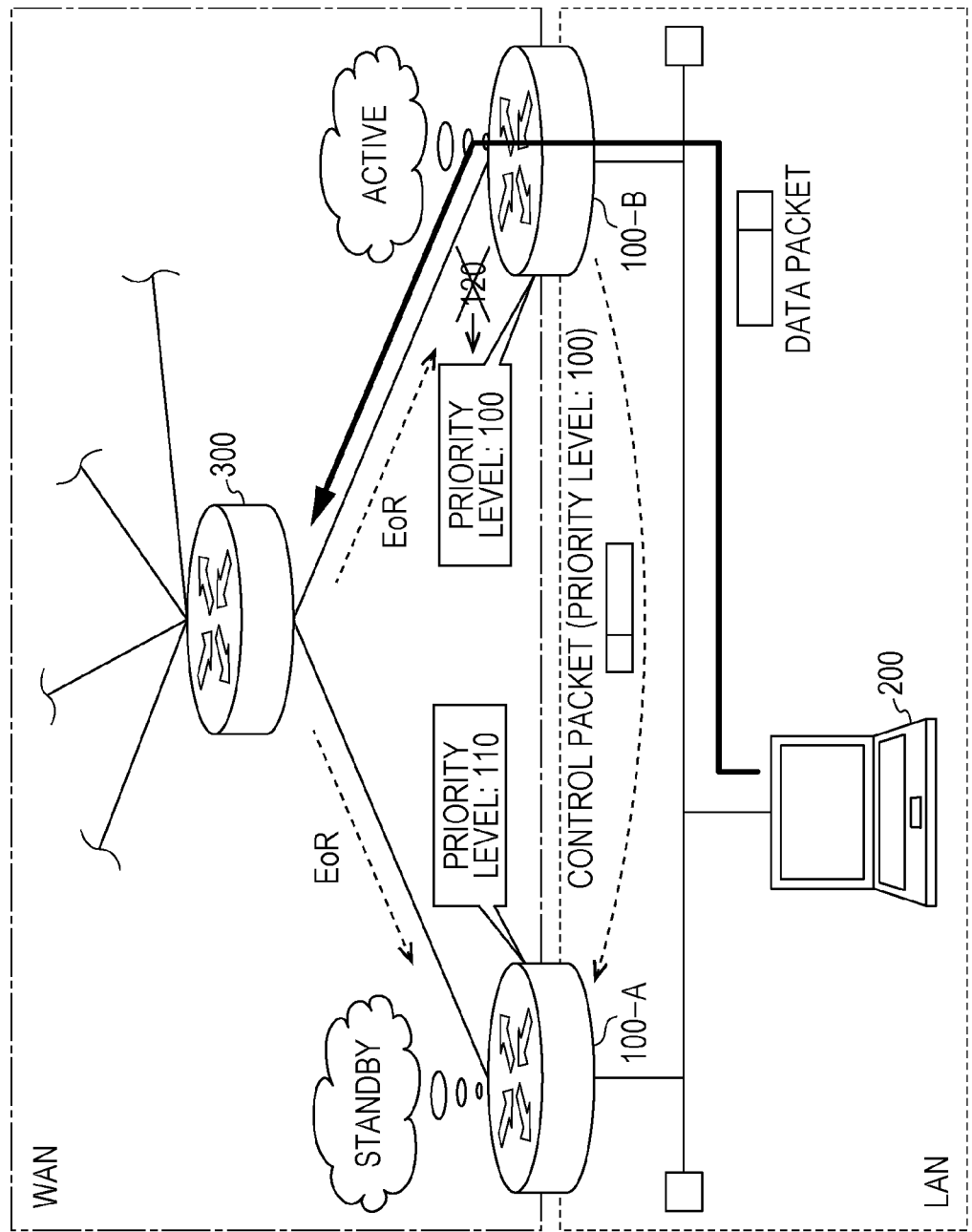
FIG. 10 is a diagram illustrating an example of operations of the VRRP routers in the first embodiment.

After that, as illustrated in FIG. 6, the second transmission unit 124c determines whether or not reception completion of the path information is detected (Step S106). As illustrated in FIG. 10, the reception completion of the path information is detected based on EoR that is transmitted from the path information storage router 300. That is, the second transmission unit 124c determines that reception of the path information is completed when receiving EoR, and notifies the second change unit 126c of the completion. When the second transmission unit 124c receives EoR, it may be determined that the VRRP router 100-A that has started to obtain path information previously completes reception of EoR. That is, path information that is received by the VRRP router 100-A and path information that is received by the VRRP router 100-B have the same information amount, so that it is determined that the learning times are substantially the same.

When the second transmission unit 124c determines that reception completion of the path information is detected (Yes in Step S106), the second change unit 126c rewrites the changed priority level into the set priority level, based on the notification of the second transmission unit 124c (Step S107). For example, the second change unit 126c obtains the priority level "100" that has been held in the priority level holding unit 126b, and rewrites the priority level "120" that has been stored in the setting information storage unit 121, into the priority level "100" based on the obtained priority level "100". As a result, as illustrated in FIG. 10, the priority level "120" of the VRRP router 100-B is changed to the priority level "100".

Figure 11:
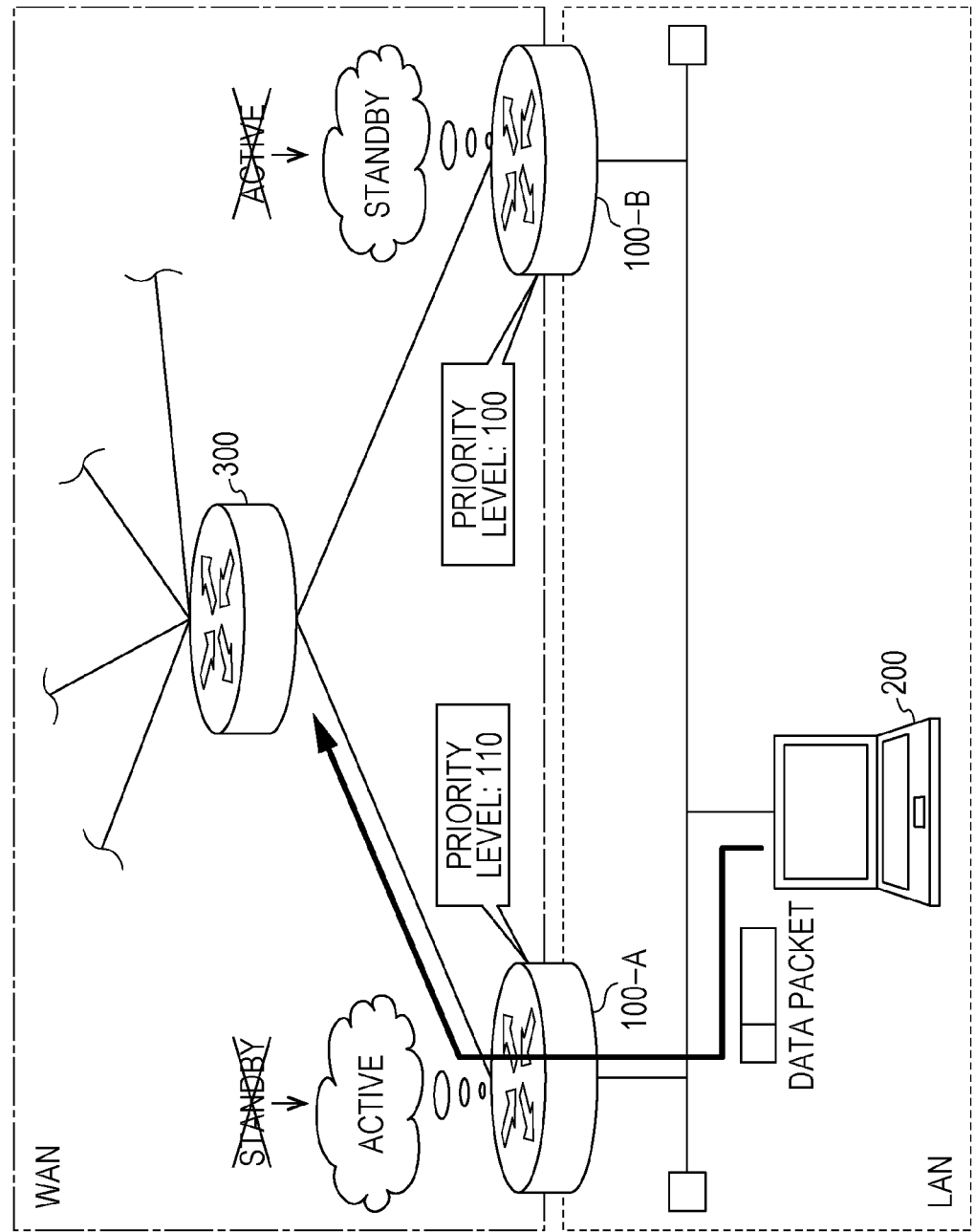
FIG. 11 is a diagram illustrating an example of operations of the VRRP routers in the first embodiment.

After that, the second transmission unit 124c transmits the set priority level to the other VRRP router 100 (Step S108). For example, the second transmission unit 124c obtains the priority level "100" that has been stored in the setting information storage unit 121, incorporates the priority level "100" into a control packet, and transmits the control packet to the VRRP router 100-A, as illustrated in FIG. 10. As a result, as illustrated in FIG. 11, the state of the VRRP router 100-A that has received the control packet is switched from "standby" to "active". In addition, the state of the VRRP router 100-B that has transmitted the control packet is switched from "active" to "standby".

As described above, in the first embodiment, in a case in which the state of the VRRP router 100-B is "active", when the VRRP router 100-B receives the priority level "110" that is higher than the set priority level "100", from the VRRP router 100-A that belongs to the same group as the VRRP router 100-B, the VRRP router 100-B changes the priority level to the priority level "120" that is higher than the received priority level "110", and transmits the priority level "120" to the VRRP router 100-A. After that, the VRRP router 100-B requests transmission of path information for the path information storage router 300. In addition, after reception of the path information is completed, the set priority level "100" is transmitted to the VRRP router 100-A. As a result, an operation before obtaining of the path information by the VRRP router 100-A is avoided. In addition, the state of the VRRP router 100-A returns to "active" after an appropriate period of time has elapsed.

(Second Embodiment)

A second embodiment is described below with reference to FIGS. 12 to 15.

FIGS. 12 to 15 are diagrams illustrating examples of operations of the VRRP routers 100-A, 100-B, and 100-C. The second embodiment is different from the above-described first embodiment in that a packet relay system S2 includes the VRRP router 100-C to which a priority level "90" is set. A function and a hardware structure of the VRRP router 100-C are similar to those of the above-described VRRP router 100-B. The VRRP routers 100-A, 100-B, and 100-C belong to the same group.

Figure 12:
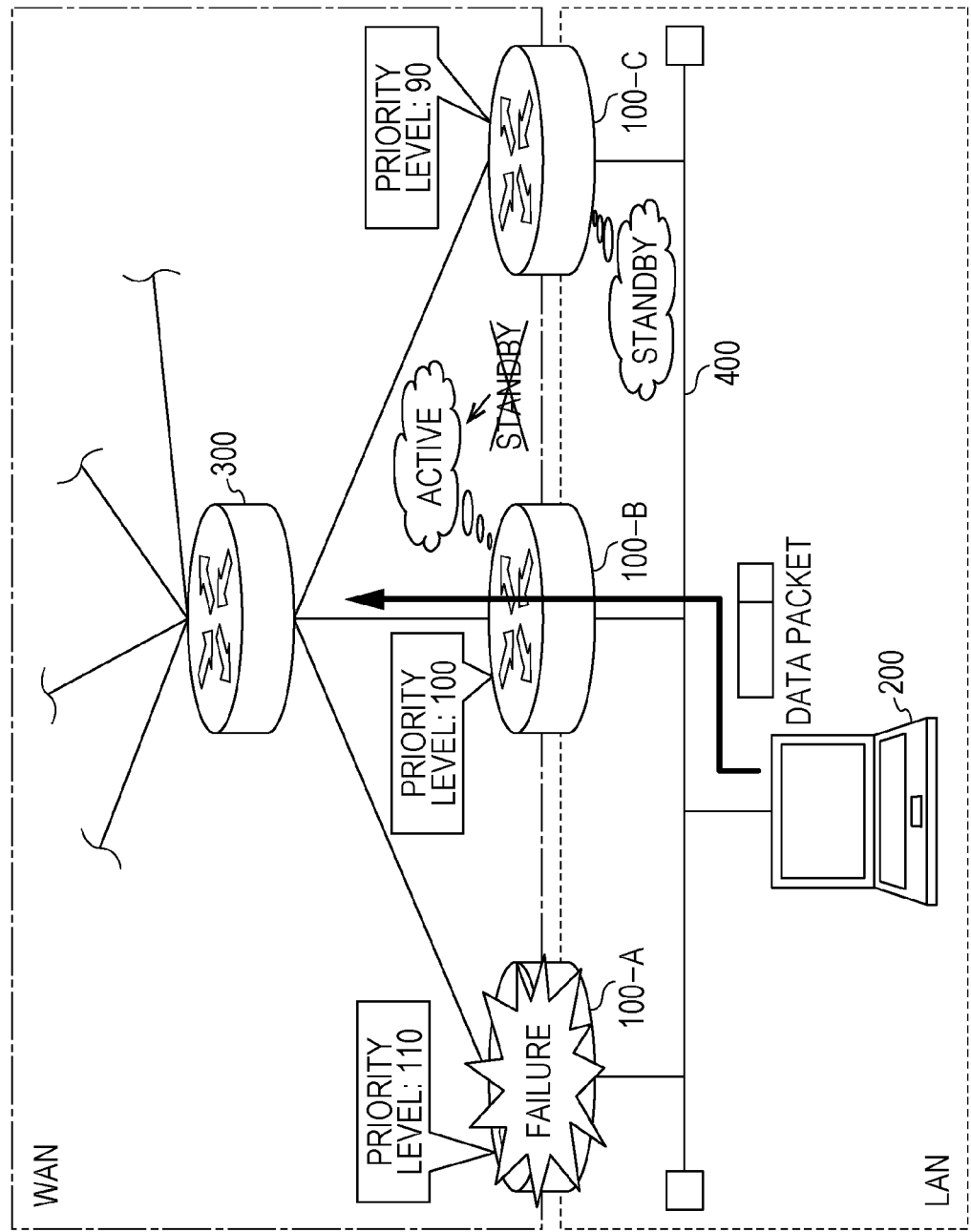
FIG. 12 is a diagram illustrating an example of operations of the VRRP routers in a second embodiment.

As illustrated in FIG. 12, when failure occurs in the VRRP router 100-A, the state of the VRRP router 100-B to which the priority level "100" has been set that is the next lowest to the priority level "110" that has been set to the VRRP router 100-A is switched from "standby" to "active". As a result, a data packet that has been transmitted from the terminal device 200 is input to the VRRP router 100-B. The VRRP router 100-B relays the input data packet to the path information storage router 300. The state of the VRRP router 100-C to which the priority level "90" has been set that is lower than the priority level "100" that has been set to the VRRP router 100-B is kept "standby".

Figure 13:
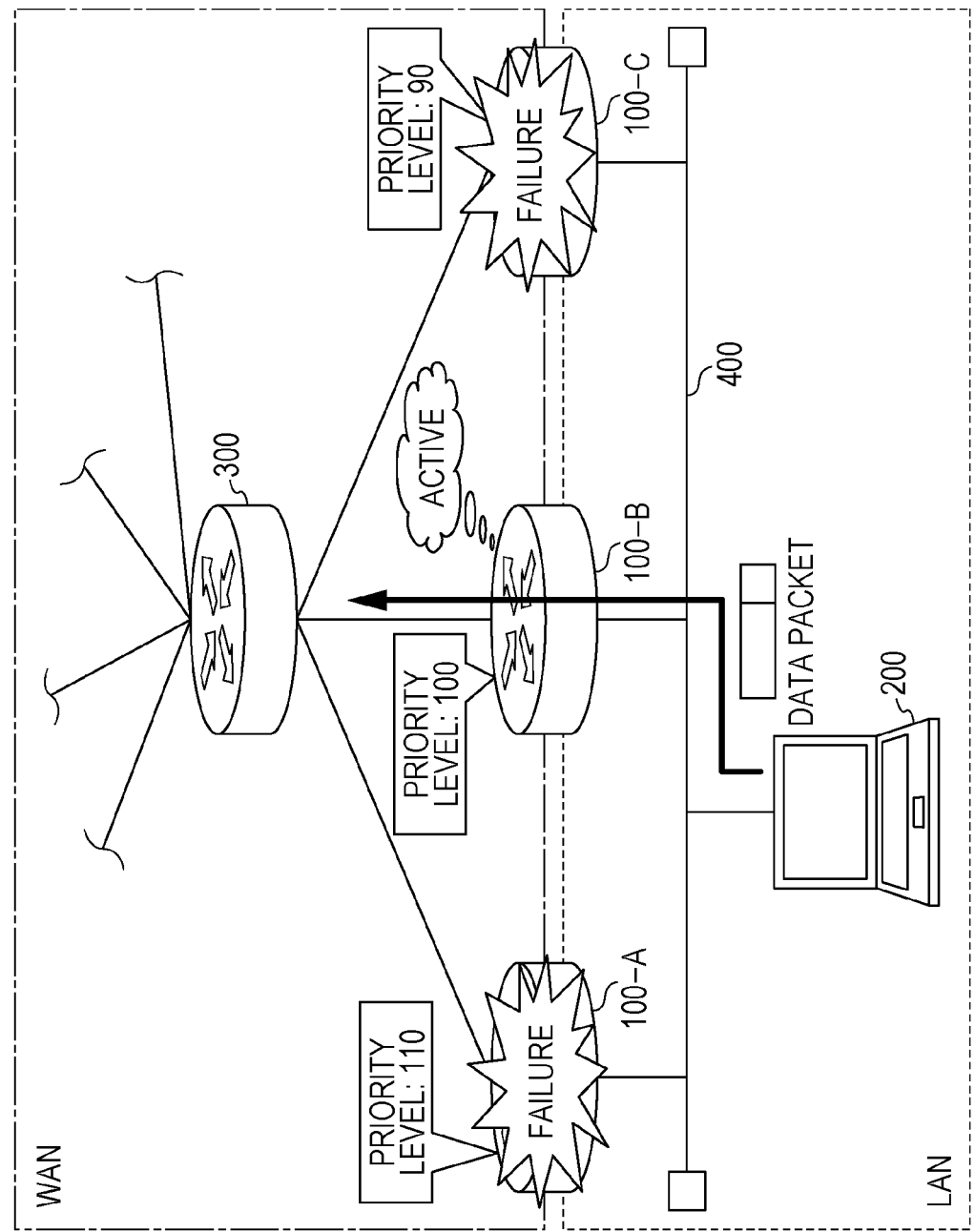
FIG. 13 is a diagram illustrating an example of operations of the VRRP routers in the second embodiment.
Figure 14:
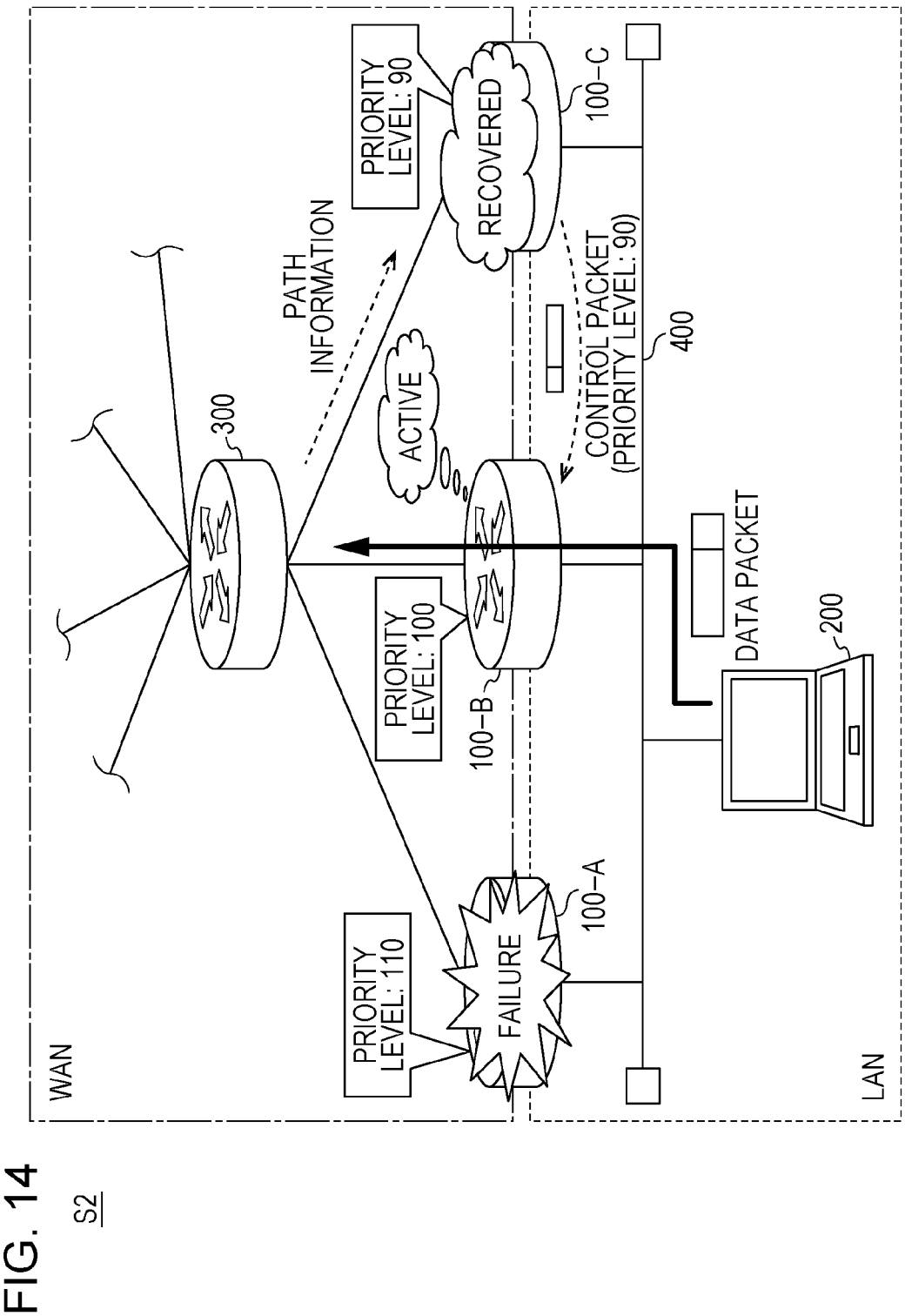
FIG. 14 is a diagram illustrating an example of operations of the VRRP routers in the second embodiment.

Here, when failure occurs in the VRRP router 100-C as illustrated in FIG. 13, and then, the VRRP router 100-C is recovered from the failure before the VRRP router 100-A is recovered from failure as illustrated in FIG. 14, the VRRP router 100-C starts to receive path information, and transmits a control packet that includes the priority level "90", to the VRRP router 100-B. However, the received priority level "90" that has been received by the VRRP router 100-B from the VRRP router 100-C is not higher than the priority level "100" that has been set to the VRRP router 100-B. Therefore, in the VRRP router 100-B, the operation is not changed based on the control packet that has been transmitted from the VRRP router 100-C. Thus, a data packet that has been transmitted from the terminal device 200 is still input to the VRRP router 100-B. The VRRP router 100-B relays the input data packet to the path information storage router 300.

In addition, as illustrated in FIG. 15, when the VRRP router 100-A is recovered from failure, the VRRP router 100-A starts to receive path information, and transmits a control packet that includes the priority level "110", to the VRRP router 100-B. The priority level "110" that has been received by the VRRP router 100-B from the VRRP router 100-A is higher than the priority level "100" that has been set to the VRRP router 100-B. Therefore, in the VRRP router 100-B, the operation is changed based on the control packet that has been transmitted from the VRRP router 100-A. For example, as illustrated in FIG. 15, the priority level "100" that has been set to the VRRP router 100-B is changed to the priority level "120". The operation of the VRRP router 100-B the priority level of which has been changed is similar to the operation of the processing in Steps S104 to S108 that is described with reference to FIG. 6.

The embodiments discussed herein are described above. In the packet relay device, the packet relay system, and the packet relay method according to the embodiments, it is avoided that a master packet relay device that belongs to the same group as the other packet relay devices becomes in an operation state before the master packet relay device completes reception of path information. In the embodiments discussed herein, various modifications and changes may be made. For example, two functions may be achieved by a single device, and a single function may be distributed to two or more devices. In the above-described embodiments, the description is made by using the term of "relay", but a term of "transfer" (forwarding) may be used instead of the term of "relay". In addition, in the above-described embodiments, the description is made by using the priority levels "90", "100", "110", and "120", but a certain numerical value in a range from "1" to "255" may be used as a priority level.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet relay system comprising:
a first packet relay device coupled to a path information storage storing path information indicating a node to which a received packet is to be transmitted; and
a second packet relay device coupled to the path information storage, wherein
a first priority level is set to the first packet relay device and a second priority level is set to the second packet relay device, the first priority level is higher than the second priority level,
when the first packet relay device is an error state, the second packet relay device relays a packet,
when the first packet relay device recovers from the error state, the first packet relay device starts to receive the path information from the path information storage, and the first packet relay device transmits a first notification to the second packet relay device, the first notification notifies the second packet relay device of the first priority level,
after the second packet relay device receives the first notification, the second packet relay device changes the second priority level to a third priority level that is higher than the first priority level and transmits a second notification to the first packet relay device, the second notification notifies the first packet relay device of the third priority level,
after the second packet relay device receives the first notification, the second packet relay device requests the path information storage to transmit the path information,
the second packet relay device receives the path information,
after receiving the path information, the second packet relay device changes the third priority level to the second priority level and transmits a third notification to the first packet relay device, the third notification notifies the first packet relay device of the second priority level, and
after the first packet relay device receives the third notification, the first packet relay device determines, based on the path information, a node to which a received packet is to be transmitted, and transmits the received packet to the determined node.

2. The packet relay system according to claim 1, wherein the second packet relay device is in an active state when the first packet relay device is in the error state.

3. The packet relay system according to claim 2, wherein first packet relay device is controlled under a standby state based on the second notification.

4. The packet relay system according to claim 3, wherein the first packet relay device transitions from the standby state to an active state after the second packet relay device receives the path information.

5. The packet relay system according to claim 4, wherein the first packet relay device transitions from the standby state to the active state based on the third notification.

6. A packet relay method using a packet relay system, the packet relay system being configured to relay a packet and including a first packet relay device, a second packet relay device and a path information storage storing path information indicating a node to which a received packet is to be transmitted, the path information storage being coupled to the first packet relay device and the second packet relay device, a first priority level being set to the first packet relay device and a second priority level being set to the second packet relay device, the second priority level being lower than the first priority level, the packet relay method comprising:
when the first packet relay device is an error state, relaying, by the second packet relay device, a packet;
when the first packet relay device recovers from an error state, starting, by the first packet relay device, to receive the path information from the path information storage, and transmitting, from the first packet relay device to the second packet relay device, a first notification that notifies the second packet relay device of the first priority level;
after the transmitting of the first notification, changing, by the second packet relay device, the second priority level to a third priority level that is higher than the first priority level and transmitting, from the second packet relay device to the first packet relay device, a second notification that notifies the first packet relay device of the third priority level;
after the transmitting of the first notification, transmitting, from the second packet relay device to the path information storage, a request that requests the path information storage to transmit path information;
receiving, by the second packet relay device, the path information;
after the receiving of the path information, changing, by the second packet relay device, the third priority level to the second priority level and transmitting, from the second packet relay device to the first packet relay device, a third notification that notifies the first packet relay device of the second priority level; and after receiving of the third notification, determining, by the first packet relay device, based on the path information, a node to which a received packet is to be transmitted, and transmitting, by the first packet relay device, the received packet to the determined node.

7. The packet relay method according to claim 6, wherein the second packet relay device is in an active state when the first packet relay device is in the error state.

8. The packet relay method according to claim 7, further comprising:

based on the second notification, controlling the first packet relay device under a standby state.

9. The packet relay method according to claim 8, further comprising:

transitioning the first packet relay device from the standby state to an active state after the second packet relay device receives the path information.

10. The packet relay method according to claim 9, wherein the first packet relay device transitions from the standby state to the active state based on the third notification.

11. A packet relay device configured to be coupled to another packet relay device and a path information storage storing path information indicating a node to which a received packet is to be transmitted, a first priority level being set to the another packet relay device and a second priority level being set to the packet relay device, the second priority level being lower than the first priority level, the packet relay device comprising:

a memory; and a processor coupled to the memory and configured to
when the another packet relay device is an error state, relay a packet,
when the another packet relay device recovers from the error state, receive a first notification form the another packet relay device, the first notification notifying the first priority level,
after receiving the first notification, change the second priority level to a third priority level higher than the first priority level and transmit a second notification to the packet relay device, the second notification notifies the packet relay device of the third priority level,
after receiving the first notification, request the path information storage to transmit the path information,
receive the path information, and
after receiving the path information, change the third priority level to the second priority level and transmit a third notification to the another packet relay device, the third notification notifies the another packet relay device of the second priority level.

\* \* \* \* \*